US012710201B2

(12) United States Patent
Kakosimos et al.

(10) Patent No.: US 12,710,201 B2
(45) Date of Patent: Aug. 18, 2026

(54) SOLAR RECEIVER WITH VARIED REFLECTIVITY

(71) Applicant: Qatar Foundation for Education, Science and Community Development, Doha (QA)

(72) Inventors: Konstantinos E. Kakosimos, Doha (QA); Fathya Salih, Doha (QA); Athanasios G. Konstandopoulos, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 490 days.

(21) Appl. No.: 18/208,044

(22) Filed: Jun. 9, 2023

(65) Prior Publication Data

US 2023/0400225 A1 Dec. 14, 2023

Related U.S. Application Data

(60) Provisional application No. 63/351,208, filed on Jun. 10, 2022.

(51) Int. Cl.

*F24S 23/70* (2018.01)
*F24S 10/80* (2018.01)
*F24S 20/20* (2018.01)

(52) U.S. Cl.

CPC ............... *F24S 23/82* (2018.05); *F24S 10/80* (2018.05); *F24S 20/20* (2018.05); *F24S 2023/84* (2018.05)

(58) Field of Classification Search

CPC ... F24S 2023/86; F24S 20/20; F21V 2200/00; F21V 7/28

See application file for complete search history.

(56) References Cited

U.S. PATENT DOCUMENTS

| | | | | |
|---|---|---|---|---|
| 4,262,657 A * | 4/1981 | McCullough | F24S 80/56 | 126/711 |
| 4,913,129 A * | 4/1990 | Kelly | F24S 20/20 | 126/681 |
| 5,735,262 A * | 4/1998 | Houtman | F24S 20/20 | 126/649 |
| 2012/0235411 A1* | 9/2012 | Hunka | F03D 9/007 | 60/641.14 |
| 2015/0330668 A1* | 11/2015 | Wagner | F24S 20/20 | 126/704 |

FOREIGN PATENT DOCUMENTS

| | | | |
|---|---|---|---|
| DE | 102016208215 A1 * | 11/2017 | F24S 70/16 |
| WO | WO-2014208355 A1 * | 12/2014 | F24S 20/20 |

OTHER PUBLICATIONS

Du, et al.; "Experiment and optimization study on the radial graded porous volumetric solar receiver matching non-uniform solar flux distribution"; ScienceDirect; vol. 275; Oct. 2020; (9 pages).

(Continued)

*Primary Examiner* — Jorge A Pereiro
(74) *Attorney, Agent, or Firm* — K&L Gates LLP

(57) ABSTRACT

A solar receiver includes a porous structure with a uniform or a varying porosity. The porous structure may include specular reflective region on at least one surface and a diffusive reflective region on at least one surface.

19 Claims, 5 Drawing Sheets

(56) References Cited

OTHER PUBLICATIONS

Avila-Marin, et al.; "Modelling strategies for porous structures as solar receivers in central receiver systems: A review"; ScienceDirect; vol. 111; Sep. 2019; (8 pages).

Ali, et al; "Consistent Coupled Optical and Thermal Analysis of Volumetric Solar Receivers with Honeycomb Absorbers"; ScienceDirect; vol. 145; Jan. 2020; (7 pages).

Du, et al.; "Optical and radiative properties analysis and optimization study of the gradually-varied volumetric solar receiver"; ScienceDirect; vol. 207; Dec. 2017; (9 pages).

* cited by examiner 105c
105a
105d
112
115
105b
Reflected solar radiation
110
100

SOLAR RECEIVER WITH VARIED REFLECTIVITY

CROSS-REFERENCES TO RELATED APPLICATIONS

The present disclosure claims priority to U.S. Provisional Patent Application 63/351,208 titled "Solar Receiver" having a filing date of Jun. 10, 2022, the entirety of which is incorporated herein.

BACKGROUND

As the search for alternative energy technologies advances, the market for matured solar energy technologies, like photovoltaics, grows. Another solar-to-thermal energy technology, Concentrating Solar Power (CSP), offers another potentially commercially success alternative energy option, due to its compatibility with thermal energy storage. CSP systems generate electricity by using thermal energy from solar radiation which the system focuses on a particular area containing a receiver, for instance with the use of reflecting mirrors. In fact, one particular type of CSP system, linear CSP systems has reached a certain level of maturity and are deployed in certain industrial and demonstrative applications in Spain, Jordan, and Australia, for example. However, attention has shifted towards another type of CSP system, central and point focus CSP systems ("central CSP"), in which reflectors direct solar radiation towards a central receiver with the reflectors encircling the receiver, as these can achieve higher concentration ratios, higher working fluid temperatures, and, in turn, higher solar-to-electric efficiencies.

Though a central CSP system is composed of many parts, the receiver is of particular interest, as it is where the solar-to-thermal energy conversion step occurs, and so the receiver is where thermal efficiens of central CSP systems can be improved. Some of the most successful, demonstrated central CSP receivers are volumetric receivers. Volumetric receivers are porous structures that receive concentrated solar radiation and a heat transfer fluid (i.e. the ambient air is many central CSP systems) through the same inlet port and utilize the entire volumes of the receivers to absorb radiation. Current volumetric receivers, however, are unable to achieve the volumetric effect—where radiation is absorbed through the entire volume of the receiver and the frontal solid temperature is lower than the exit gas temperature. The state of the art volumetric receivers absorb 90% of the radiation they absorb in only the front 20% of the receiver. Improved volumetric behavior, i.e. the closer a receiver is to achieving the volumetric effect, is expected to improve thermal performance improving the overall solar-to-electric efficiency of the system.

Accordingly, a need exists for a solar receiver with improved volumetric behavior and thermal efficiencies.

SUMMARY

The present disclosure generally relates to an improved solar receiver.

In light of the present disclosure, and without limiting the scope of the disclosure in any way, in an aspect of the present disclosure, which may be combined with any other aspect listed herein unless specified otherwise, a solar receiver is provided.

In an aspect of the present disclosure, which may be combined with any other aspect listed herein unless specified otherwise, the solar receiver includes a porous structure, which includes a uniform or varying porosity distribution throughout. The porous structure may also include a specular reflective region and a diffusive reflective region.

In an aspect of the present disclosure, which may be combined with any other aspect listed herein unless specified otherwise, the porous structure has at least one of the following: a monolithic or assembled honeycomb shape, a stacked shape plate, a corrugated structure, or a foam structure.

In an aspect of the present disclosure, which may be combined with any other aspect listed herein unless specified otherwise, the porous structure may be formed from a plurality of channels having a solar radiation receiving side and a heat transfer side, with each channel including at specular reflective region on at least one surface and a diffusive reflective region on at least one surface of the channel.

In an aspect of the present disclosure, which may be combined with any other aspect listed herein unless specified otherwise, a method of fabricating a solar receiver is provided. The method may include applying a desired reflectivity distribution of specular reflective regions and diffusive reflective regions to surfaces of planar pieces of a porous material. The method may further include assembling the planar pieces into a porous structure, wherein the porous structure has a uniform or varying porosity, and porous structure includes at least one specular reflective region on at least one surface of the porous structure and at least one diffusive reflective region on at least one surface of the porous structure.

The reader will appreciate the foregoing details, as well as others, upon considering the following detailed description of certain non-limiting embodiments including a solar receiver and method of making thereof according to the present disclosure.

BRIEF DESCRIPTION OF THE DRAWINGS

The accompanying figures depict various elements of the one or more embodiments of the present disclosure, and are not considered limiting of the scope of the present disclosure.

In the Figures, some elements may be shown not to scale with other elements so as to more clearly show the details. Additionally, like reference numbers are used, where possible, to indicate like elements throughout the several Figures.

DETAILED DESCRIPTION

The present disclosure is generally related to a solar receiver.

Previous works have attempted to attain the volumetric effect by axially varying the porosity of the receiver to obtain an open front section that allows for greater radiation penetration, followed by a denser section to improve heat transfer coefficients. However, many of these designs were only marginally successful at improving the volumetric effect. And those that did have greater success at obtaining the volumetric effect were complex and difficult to manufacture such varying porosity designs.

The receiver presented in this disclosure significantly improves the volumetric behavior of a honeycomb receiver, while remaining simple and manufactural. This is achieved by applying varied reflectivity distributions (specular and diffuse) on the irradiated surfaces to improve radiation penetration, while maintaining a simple, easy-to-manufacture design.

Figure 1:
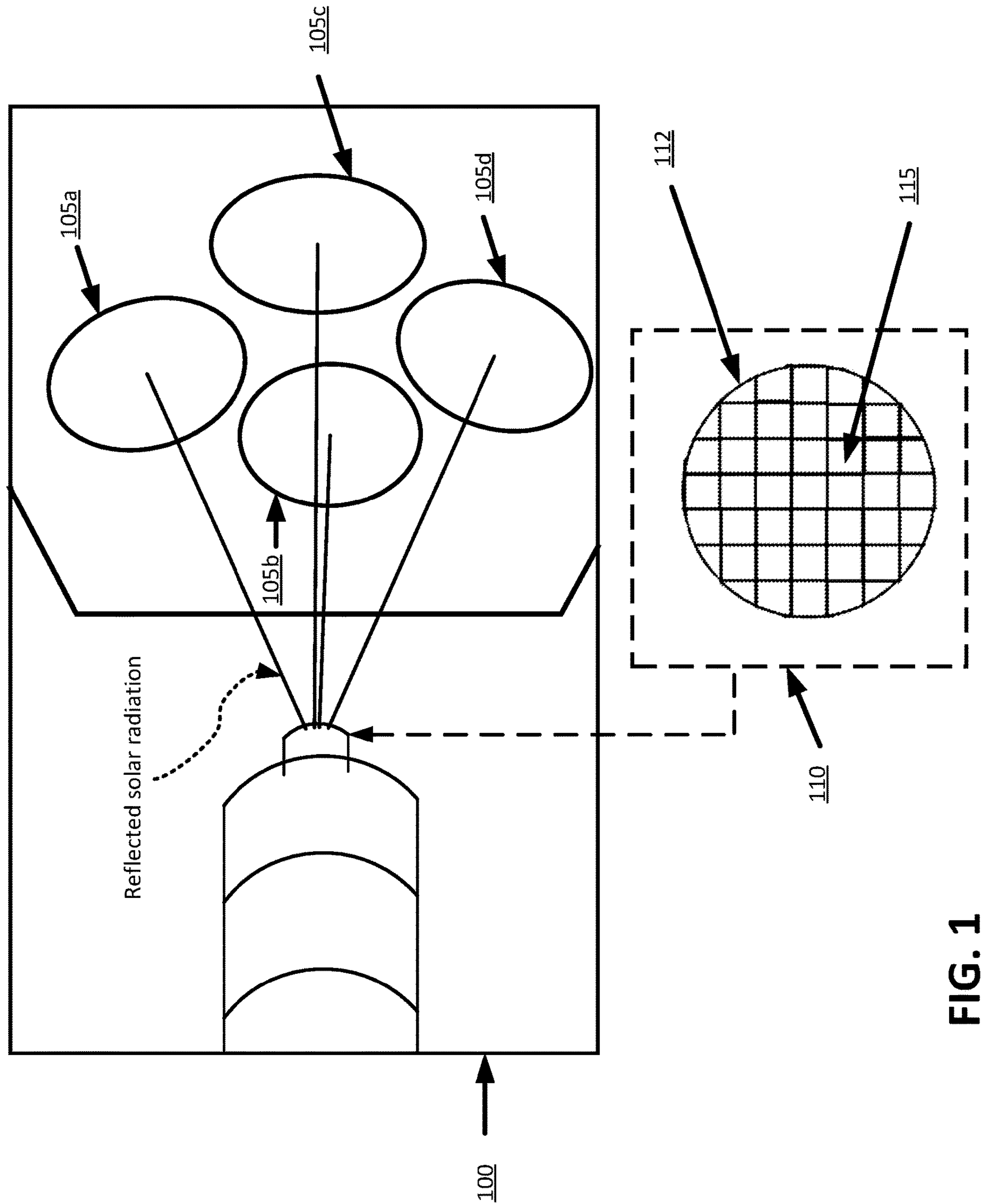
FIG. 1 illustrates an example Central CSP system utilizing a solar receiver according to an aspect of the present disclosure.

According to an embodiment of the present disclosure, a solar receiver is provided. FIG. 1 illustrates a central CSP system utilizing an example solar receiver of the present disclosure. The system 100 may include a plurality of solar radiation sources, such as parabolic reflectors reflecting rays from the sun, e.g. solar radiation sources 105*a-d*. The plurality of solar radiation sources 105*a-d* concentrates solar radiation on a central area, solar receiver 110. The porous structure 112 of the receiver 110 absorbs the concentrated irradiance and transfers that heat to the working fluid (e.g. a gas, such as the ambient air flowing into the porous structure). As the heated fluid, or gas, can reach temperatures up to 1000° C., it can be used in a turbine to generate electricity or used to supply both medium and high temperature thermal energy for industrial applications.

The porous structure 112 may be formed into a monolithic receiver with an assembled honeycomb shape. Alternatively, the porous structure 112 may be formed into any structured shape. For example, it may be formed into an assembled honeycomb shape, a stacked shaped plate, a corrugated plate, or a foam shape. The porous structure 112 may be made of a MAX-phase ceramic material or any porous material that can withstand the high radiative flux experienced by the receiver 110, for example $Ti_3SiC_2$. The porous structure 112 may form or include a plurality of channels, e.g. channel 115. Each channel may be square-shaped, as shown in FIG. 1, or hexagonal, circular, or any other suitable channel shape in which solar irradiance may penetrate the channel. Each channel may have a channel radius of approximately 2 mm and channel length of 50 mm.

Figure 2A:
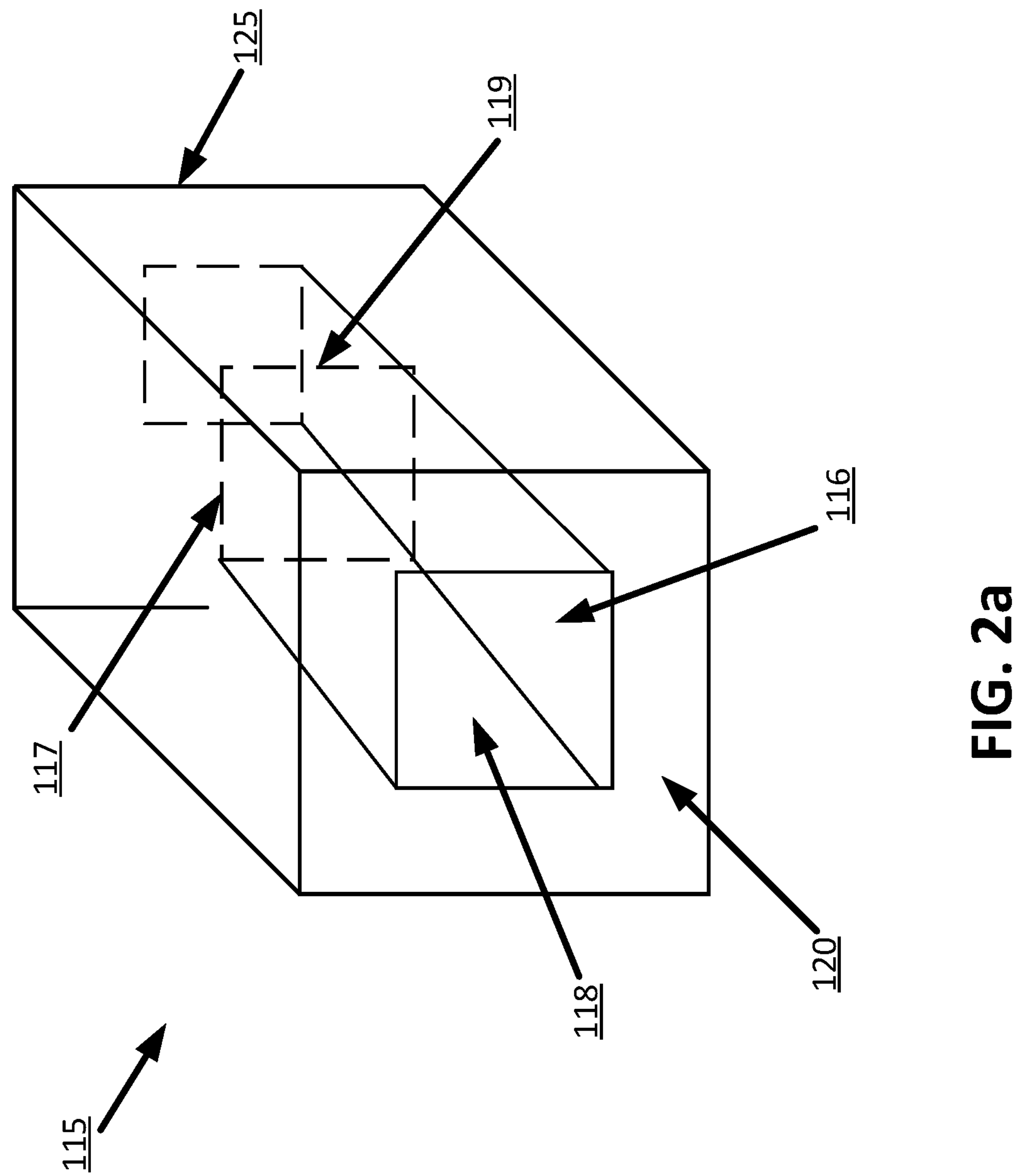
FIGS. 2*a-c* illustrate various example channels of a porous structure according to an aspect of the present disclosure

Although the porous structure may include a plurality of channels, for ease of explanation, a reduced geometry of the porous structure 112 resulting in a single channel 115*a* may be described, as shown in FIG. 2*a*; however, it should be considered that each channel in the plurality may include these features. Channel 115*a* may extend from a solar radiation receiving face 120 of the porous structure 112/channel 115*a* to a heat transfer face 125 of the porous structure 112/channel 115. Channel 115*a* may include a bottom surface 116, a top surface 117, and side surfaces 118 and 119. Channel 115*a* may be composed of the same material as the porous structure 112. The porous structure 112, i.e. the porous material forming the surfaces of the channel 115*a*, may have a uniform porosity distribution throughout. This avoids complicated manufacturing procedures associated with fabricating a porous structure with a graded-porosity.

Figure 2B:
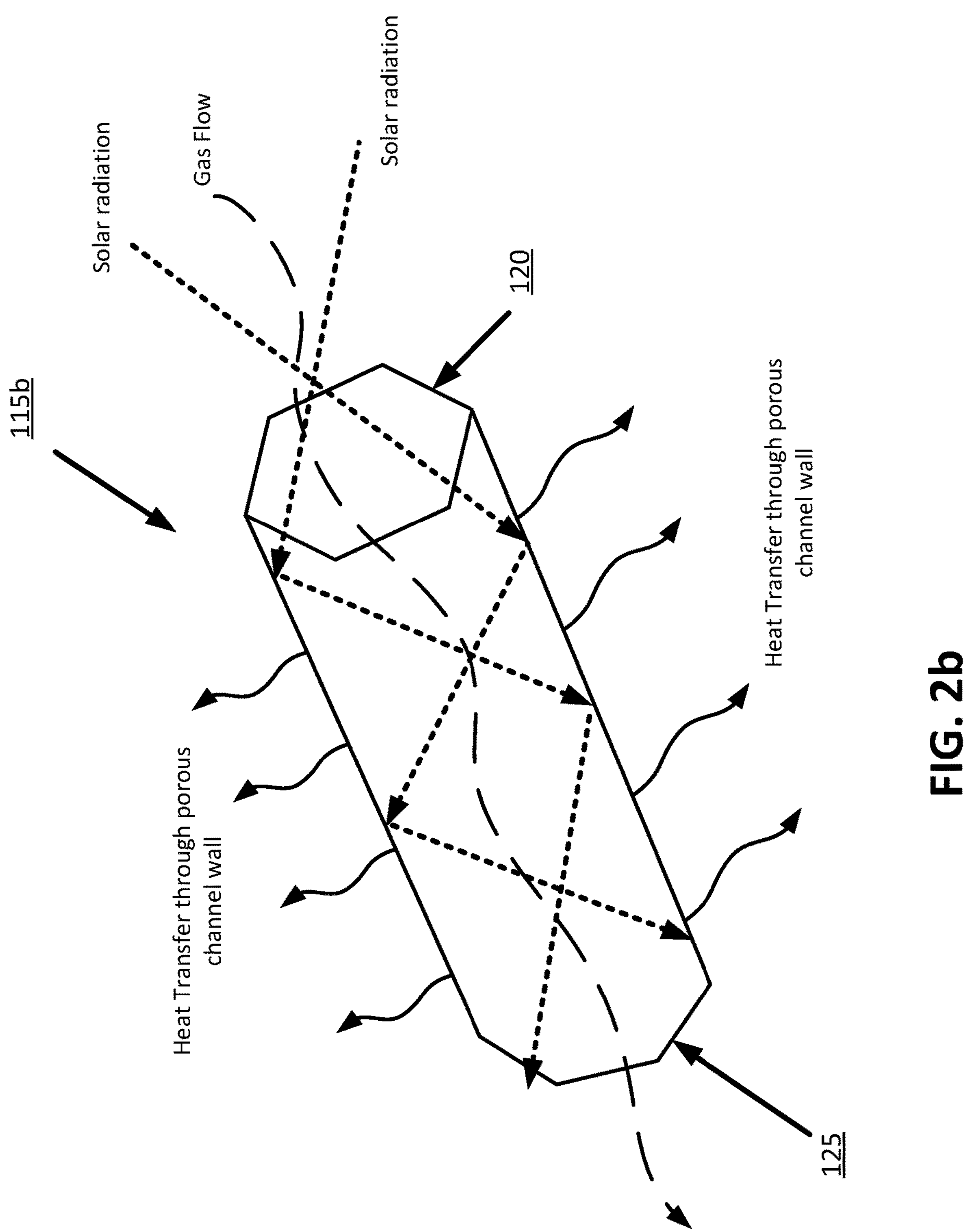

As shown in FIG. 2*b*, solar radiation enters the channel 115*b* at the solar radiation receiving face 120 and is reflected among the surfaces of channel 115*b* to reach the heat transfer face 125. Additionally, the heat transfer fluid, such as a gas like the ambient air flows through the same radiation receiving face 120, along the channel and out through the heat transfer face 125, where the heated gas may then be utilized for generating electricity via, for example, a steam turbine or any other suitable thermal industrial application. Also, the solar radiation reflected among the surfaces of channel 115*b* results in heat transfer through the porous channel walls of channel 115*b*. In the scenario that channel 155*b* is one channel in a plurality of channels included in the porous structure 112 of the solar receiver 110, this heat transfer provides heat by natural convection to the other channels in receiver 110, increasing the overall radiation and heat absorbed by the receiver 110, thereby improving the thermal performance.

Figure 2C:
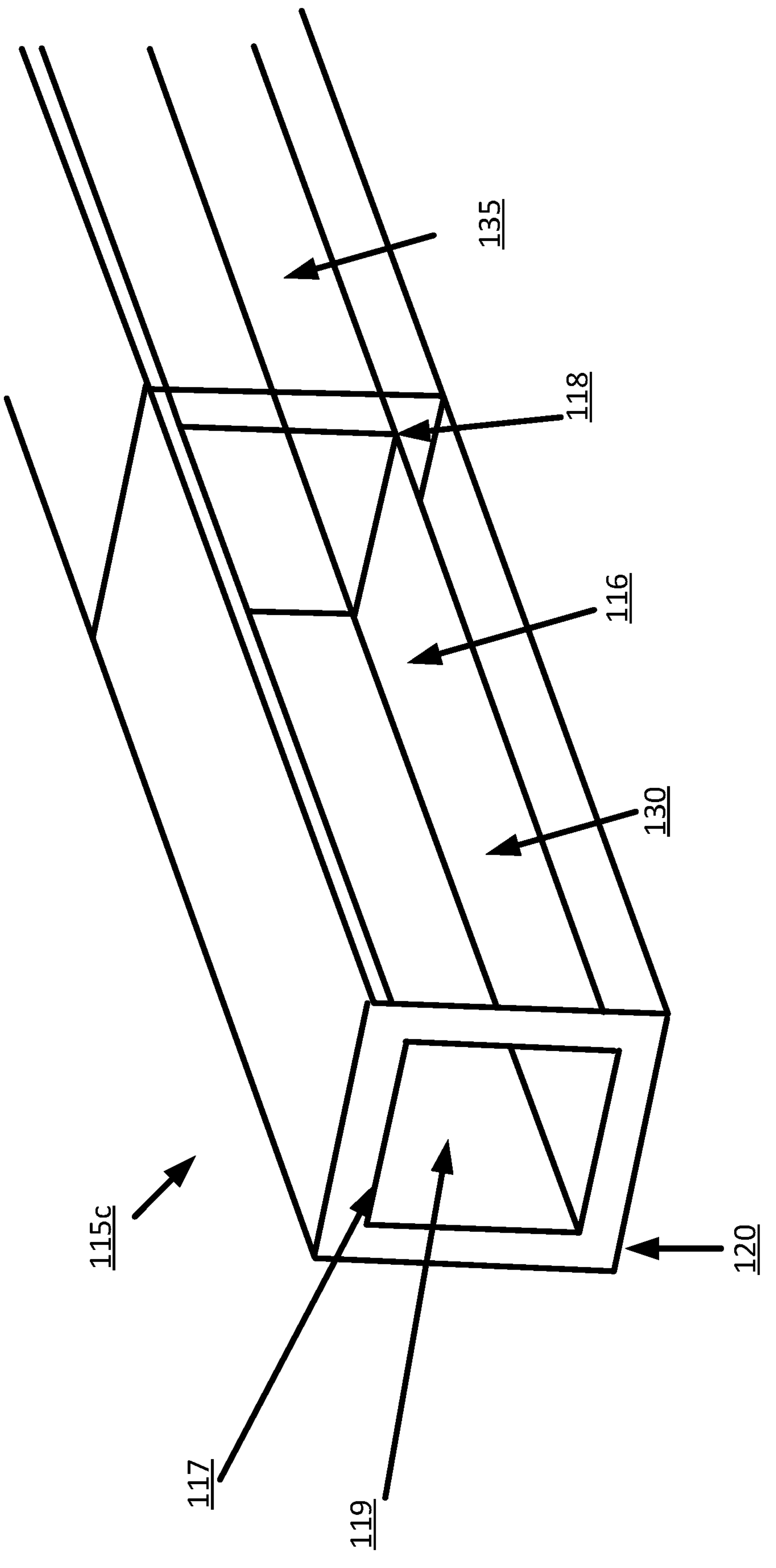

The porous structure 112 may include a specular reflective region on at least one surface and a diffusive reflective region on at least one surface. FIG. 2*c* illustrates another example porous structure of a solar receiver of the present disclosure reduced to a single channel 115*c*. The single channel is shown from a perspective which allows the viewer to see through channel side surface 117. Channel 115*c* includes a specular reflective region 130 and a diffusive reflective region 135. In fact, the values of specular and diffuse reflectivities of the specular and diffusive reflective regions respectively, may be specified on all irradiated surfaces of channel 115*a*. The use of a specular reflective region 130 improves the reflectivity in the channel which in turn improves the irradiance penetration of the receiver. This results in the volume of the receiver being more fully utilized resulting in improved volumetric behavior and improved thermal performance, for example compared to varied-porosity designs. For instance, a receiver of certain dimensions and absorptivity distribution may increase its thermal efficiency from 0.80 to 0.91 by incorporating specular reflection into some of the low absorptivity regions of the porous structure.

Although FIG. 2*c* depicts these regions on the same surface of a channel of the porous structure 112, the specular reflective region 130 and the diffusive reflective region 135 may each be on varying surfaces of the porous structure. For example, with reference to channel 115*c* of the porous structure 112, the specular reflective region 130 may be positioned on the side surfaces of the channel 115*c*, while the diffusive specular region 135 may be positioned on the top 117 and bottom 116 surfaces of the channel 115*c*, or vice versa. Similarly, the specular reflective region 130 and the diffusive reflective region 135 may be on opposite surfaces relative to one another, adjacent surfaces, or the same surface.

Figure 3:
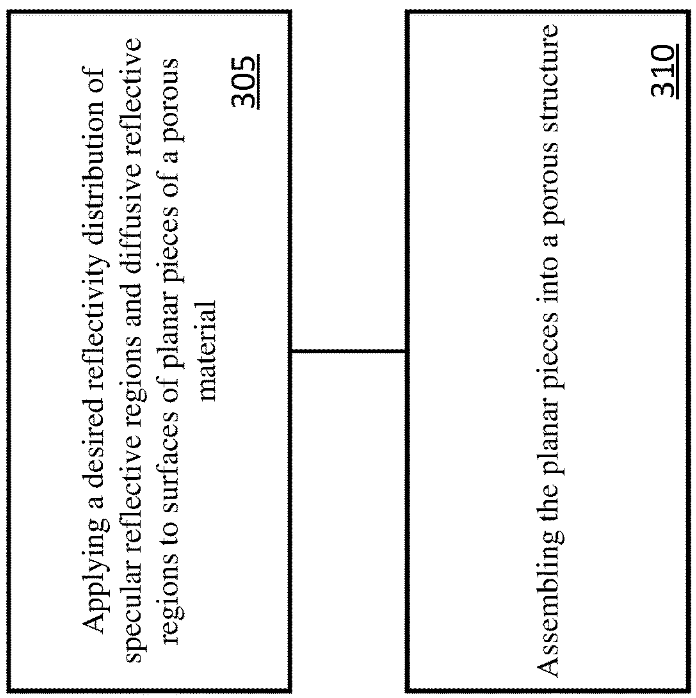
FIG. 3 is a flowchart illustrating a solar receiver fabrication method according to an aspect of the present disclosure.
Figure 3:
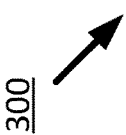

According to another embodiment of the present disclosure, a method of manufacturing the solar receiver is provided. FIG. 3 illustrates a flowchart of an example method for fabricating a solar receiver. Example method 300 includes applying a desired reflectivity distribution of specular reflective regions and diffusive reflective regions to surfaces of planar pieces of a porous material (block 305). For example, one may apply the desired reflectivity distribution to planar pieces that are used to construct a porous structure formed of square-shaped channels. The desired reflectivity distribution may be applied to the pieces using physical methods, like polishing or sputtering, or chemical methods, like chemical polishing, applying coatings, or chemical vapor deposition. Example method 300 also includes assembling the planar pieces into a porous structure, wherein the porous structure has a uniform or varying porosity, and porous structure includes at least one specular reflective region on at least one surface of the porous structure and at least one diffusive reflective region on at least one surface of the porous structure (block 410). This steps of this method may be performed in an order different to the order displayed in FIG. 3. For example, the planar pieces may be assembled to form a monolithic receiver before then applying the desired reflectivity distribution of specular reflective regions and diffusive reflective regions to achieve specified reflectivities to the surfaces on the planar pieces.

Given the improved volumetric behavior and thermal performance of the solar receiver utilizing varied specular and diffusive reflective regions of the present disclosure, an improved solar receiver that does not involve complicated graded-porosity designs is provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A solar receiver, comprising:

a porous structure;

wherein the porous structure comprises at least one channel, wherein the porous structure includes a uniform or varying porosity distribution, wherein the at least one channel comprises a first pair of opposing surfaces and a second pair of opposing surfaces, wherein the at least one channel has a length and an opening height, wherein the length is larger than the opening height, wherein the first pair of opposing surfaces comprise a specular reflective region, wherein the second pair of opposing surfaces comprise a diffuse reflective region, wherein a reflectivity of at least one of the specular reflective region or the diffuse reflective region varies along a length of the at least one channel wherein the at least one channel has a polygonal cross-section, wherein the first pair of opposing surfaces are a first and second side of the at least one channel, and wherein the second pair of opposing surfaces are a third and fourth side of the at least one channel.

2. The solar receiver of claim 1, wherein the porous structure has at least one of the following: a monolithic or assembled honeycomb shape, a stacked shape plate, a corrugated structure, or a foam structure.

3. The solar receiver of claim 1, wherein the specular reflective region has higher reflectivity compared to the total reflectivity of the diffuse reflective region.

4. The solar receiver of claim 1, wherein the surface comprising the specular reflective region is a surface of a channel of the porous structure that is opposite to the surface comprising the diffuse reflective region.

5. The solar receiver of claim 1, wherein the surface comprising the specular reflective region is a surface of a channel of the porous structure that is adjacent to the surface comprising the diffuse reflective region.

6. The solar receiver of claim 1, wherein the surface comprising the specular reflective region is a surface of a channel of the porous structure that is the same surface comprising the diffuse reflective region.

7. A solar receiver, comprising:

a plurality of channels forming a porous structure, each channel extending from a solar radiation collection side to a heat transfer side, each channel including a uniform or varying porosity distribution, wherein each channel comprises a first pair of opposing surfaces and a second pair of opposing surfaces, wherein the first pair of opposing surfaces comprise a specular reflective region, wherein the second pair of opposing surfaces comprise a diffuse reflective region, wherein a reflectivity of at least one of the specular reflective region or the diffuse reflective region varies along the length of each channel, wherein each channel has a length and an opening height, wherein the length is larger than the opening height, wherein each channel has a polygonal cross-section, wherein the first pair of opposing surfaces are a first and second side each channel, and wherein the second pair of opposing surfaces are a third and fourth side each channel.

8. The solar receiver of claim 7, wherein the specular reflective region has higher reflectivity compared to the total reflectivity of the diffuse reflective region.

9. The solar receiver of claim 7, wherein the surface comprising the specular reflective region is a surface of a channel of the porous structure that is opposite to the surface comprising the diffuse reflective region.

10. The solar receiver of claim 7, wherein the surface comprising the specular reflective region is a surface of a channel of the porous structure that is adjacent to the surface comprising the diffuse reflective region.

11. The solar receiver of claim 7, wherein the surface comprising the specular reflective region is a surface of a channel of the porous structure that is the same surface comprising the diffuse reflective region.

12. A method of fabricating a solar receiver comprising:

applying a desired reflectivity distribution of specular reflective regions and diffusive reflective regions to surfaces of planar pieces of a porous material; and assembling the planar pieces into a porous structure, wherein the porous structure has a uniform or varying porosity, wherein the porous structure comprises at least one channel, wherein the porous structure includes a uniform or varying porosity distribution, wherein the at least one channel comprises a first pair of opposing surfaces and a second pair of opposing surfaces, wherein the at least one channel has a length and an opening height, wherein the length is larger than the opening height, wherein the first pair of opposing surfaces comprise a specular reflective region, wherein the second pair of opposing surfaces comprise a diffuse reflective region, wherein applying the desired reflectivity distribution comprises applying different reflectivity characteristics at different positions along a length of the planar pieces prior to assembly, wherein the at least one channel has a polygonal cross-section, wherein the first pair of opposing surfaces are a first and second side of the at least one channel, and wherein the second pair of opposing surfaces are a third and fourth side of the at least one channel.

13. The method of claim 12, wherein planar pieces form a porous structure having a monolithic or assembled honeycomb shape, a stacked shape plate, a corrugated structure, or a foam structure.

14. The method of claim 12, wherein the reflectivity distribution is applied utilizing one of physical sputtering, physical polishing, chemical polishing, coating application, or chemical vapor distillation.

15. The method of claim 12, wherein the reflectivity distribution is applied to the surfaces of assembled planar pieces.

16. The method of claim 12, wherein applied the specular reflective region has higher reflectivity compared to the total reflectivity of the applied diffuse reflective region.

17. The method of claim 12, wherein the surface comprising the specular reflective region is a surface of a channel of the porous structure that is opposite to the surface comprising the diffuse reflective region.

18. The method of claim 12, wherein the surface comprising the specular reflective region is a surface of a channel of the porous structure that is adjacent to the surface comprising the diffuse reflective region.

19. The method of claim 12, wherein the surface comprising the specular reflective region is a surface of a channel of the porous structure that is the same surface comprising the diffuse reflective region.

* * * * *